United States Patent
Zhai

(10) Patent No.: US 8,705,450 B2
(45) Date of Patent: Apr. 22, 2014

(54) METHOD FOR DISCOVERING PATHS WITH SUFFICIENT MEDIUM TIME IN WIRELESS MESH NETWORKS

(75) Inventor: Hongqiang Zhai, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 421 days.

(21) Appl. No.: 13/056,450

(22) PCT Filed: Jul. 8, 2009

(86) PCT No.: PCT/IB2009/052976
§ 371 (c)(1),
(2), (4) Date: Jan. 28, 2011

(87) PCT Pub. No.: WO2010/013153
PCT Pub. Date: Feb. 4, 2010

(65) Prior Publication Data
US 2011/0176487 A1    Jul. 21, 2011

Related U.S. Application Data

(60) Provisional application No. 61/084,706, filed on Jul. 30, 2008.

(51) Int. Cl.
*H04W 80/04*      (2009.01)
*H04W 88/06*      (2009.01)

(52) U.S. Cl.
USPC ........... 370/328; 370/310; 370/314; 370/443; 370/338

(58) Field of Classification Search
USPC ............ 370/310–330, 351–363, 376, 395.21, 370/395.32, 406
See application file for complete search history.

(56) References Cited

U.S. PATENT DOCUMENTS

| | | | |
|---|---|---|---|
| 7,701,965 B2* | 4/2010 | Ihori | 370/464 |
| 2006/0268727 A1* | 11/2006 | Rangarajan et al. | 370/248 |
| 2008/0170550 A1* | 7/2008 | Liu et al. | 370/338 |
| 2009/0274166 A1* | 11/2009 | Zhang et al. | 370/443 |

OTHER PUBLICATIONS

Hongqiang Zhai, "QoS Support over UWB Mesh Networks" as published in "Wireless Communications and Networking Conference, 2008. WCNC 2008. IEEE" pp. 2283-2288, Mar. 31, 2008-Apr. 3, 2008.*

(Continued)

*Primary Examiner* — Christopher Grey
*Assistant Examiner* — M Mostazir Rahman
(74) *Attorney, Agent, or Firm* — Larry Liberchuk

(57) ABSTRACT

A method (200) for discovering paths between source nodes and destination nodes in mesh wireless media (WiMedia) based networks. Each of the discovered paths has sufficient medium time to enable efficient data transfers over the path. The method comprises, upon receiving a route request (RREQ), computing a number of available medium access slots (MAS) of a wireless link between a node receiving the RREQ and a node transmitting the RREQ (S210); computing a number of required MAS to deliver data over the wireless link in an upstream direction (S220); updating a local neighbor link (LNL) list when the number of required MASs is not above the number of available MASs (S240); computing an upper bound value and a lower bound value of a sufficient medium time coefficient (CSMT) (S250); and selecting the path based on at least the upper and lower bound CSMT values (S280).

13 Claims, 2 Drawing Sheets

(56) References Cited

OTHER PUBLICATIONS

Hongqiang Zhai Edet al; "NET 09-5—QoS Support over UWB Mesh Networks", Wireless Communications and Networking Conference, 2008. WCNC 2008. IEEE, IEEE, Piscataway, NJ, USA, Mar. 31, 2008, pp. 2283-2299, XP031243988.

Gerasimov I, et al; "A Bandwidth-Reservation Mechanism for On-Demand Ad Hoc Path Finding", Annual Simulation Symposium, Computer Society Press, XX, Apr. 4, 2002, pp. 1-8, XP002328175, Chapter 1. "Introduction"; p. 1-p. 2, Chapter 3. "QoS-AODV protocol"; p. 3-6.

Xiaojiang Du; "QoS Routing Based on Multi-Class Nodes for Mobile Ad Hoc Networks" Ad Hoc Networks, vol. 2, No. 3, Apr. 17, 2004, pp. 241-254, XP002546691, Retrieved from the Internet: URL : http://linkinghub.elsevier.com/retri eve/pi i/S1570870504000228, [retrieved on Sep. 21, 2009] Chapter 3. "The path bandwidth calculation algorithm"; p. 24,3-p. 245, table 1.

Chunhung Richard Lin et al; "QoS Routing in Ad Hoc Wireless Networks", IEEE Journal on Selected Areas in Communications, IEEE Service Center, Piscataway US, vol. 17, No. 8 Aug. 1, 1999, XP011055000, ISSN: 0733-8716, section II.B. "Bandwidth Calculation"; p. 1428-p. 1430 section II.B. "Slot Assignment"; p. 1431-1432, figures 4-15.

Kamal Jain, et al; "Impact of Interference on Multi-Hop Wireless Network Performance" Wireless Networks ; The Journal of Mobile Communication, Computation and Information, Kluwer Academic Publishers, DO, vol. 11, No. 4, Jul. 1, 2005, pp. 471-487, XP019216755 ISSN: 1572-8196, Chapter 3. "Computing bounds on optimal throughput"; p. 473-p. 478.

Pan P, et al; "BGRP: a Tree-Based Aggregation Protocol for Inter-Domain Reservations" Internet Citation, Dec. 6, 1999, XP002345641, Retrieved from the Internet: URL : http ://www.cs.columbi a.edu/techreports/cucs-029-99.pdf>, [retrieved on 2009-09-071 chapter 3. "The Border Gateway Reservation, Protocol (BGRP)"; p. 5-p. 9.

* cited by examiner

METHOD FOR DISCOVERING PATHS WITH SUFFICIENT MEDIUM TIME IN WIRELESS MESH NETWORKS

This application claims the benefit of U.S. Provisional Application No. 61/084,706 filed on Jul. 30, 2008.

The invention generally relates to block transmission techniques.

The WiMedia specification for ultra-wideband (UWB) systems defines a fully distributed medium access control (MAC) protocol for wireless personal area networks (WPANs). The WiMedia MAC protocol provides a mechanism for concurrent communications between nodes of the network. To this end, nodes allocate time slots, also referred to as medium access slots (MAS) or "medium time", before transmitting data. That is, MAS or medium time should be reserved to nodes to enable them to transmit or receive data.

Current versions of the WiMedia specification support a number of different channel rates, including 53.3 Mbps, 80 Mbps, 106.7 Mbps, 160 Mbps, 200 Mbps, 320 Mbps, 400 Mbps, and 480 Mbps. The current supported transmission rates cannot be utilized to enable advanced applications, e.g., some streaming and multimedia services. For example, streaming of uncompressed high-definition video cannot be achieved in current WiMedia based WPANs. With this aim, a new generation of WiMedia specification to support transmission rates of 1 Giga bit per second (Gbps) and beyond is being developed.

With the increase of the transmission rate the transmission range decreases. Due to regulatory restrictions the transmission power and transmission range of nodes in a WPAN are limited. To extend the communication range of a WPAN, a mesh-enabled MAC protocol can be utilized in WiMedia based WPANs. The mesh-enabled MAC protocol enables a node in the network to reach another node out of its direct communication range through other intermediate nodes. The intermediate nodes forward/relay the packets from a source node towards a destination node. The operation of the mesh MAC protocol is illustrated in FIG. 1, which shows a mesh WiMedia based WPAN 100. A node 110-A cannot directly communicate with a node 110-F as they are out of each other's transmission range. However, the node 110-A can send packets to a node 110-F through mesh-enabled nodes 110-B and 110-D. Therefore, the path for transmitting data from the source node 110-A to a destination node 110-F includes the nodes 110-A, 110-B, 110-D, and 110-F. The mesh-enabled nodes are nodes that implement the mesh MAC protocol.

An optimal path is a path having sufficient medium time reserved to all nodes forming the path. In most cases the path should meet bandwidth and latency requirements of advanced applications. Therefore, a path between a source node and a destination node should be carefully selected to guarantee the bandwidth and latency requirements of such applications.

Existing path discovery and routing protocols, such as a dynamic source routing (DSR), an ad hoc on demand distance vector (AODV), and the like, typically find paths with the smallest hop count, i.e., paths traveling through the smallest number of intermediate nodes. Consequently, each hop along the path typically has a hop distance close to the largest communication range. Thus, discovered paths can support only low transmission rates, and the benefits of higher rates are not fully utilized. In addition, paths found by such discovery protocols often do not have enough resources to meet the strict bandwidth and delay requirements of multimedia and streaming services. Moreover, such protocols do not count for reservation medium time or the number of MAS reserved to nodes and links in a path. Since WiMedia based networks support multiple different rates, it may not be accurate or not even correct to reserve a fixed number of MAS at all nodes/links on the path.

Therefore, it would be advantageous to provide an efficient path discovery solution in a WiMedia mesh network. It would be further advantageous if the provided solution would estimate the available path bandwidth and support load balancing routing in such networks.

Certain embodiments include a method and computer executable code for discovering a path between a source node and a destination node in mesh wireless media (WiMedia) based networks, wherein the path has sufficient medium time to enable efficient data transfers over the path. The method comprises, upon reception of a route request (RREQ), computing a number of available medium access slots (MAS) of a wireless link between a node receiving the RREQ and a node transmitting the RREQ; computing a number of MAS required to deliver data over the wireless link in an upstream direction; updating a local neighbor link (LNL) list when the required number of MAS is not above the number of available MAS; computing an upper bound value and a lower bound value of a sufficient medium time coefficient ($C_{SMT}$); and selecting the path based on at least the upper and lower bound $C_{SMT}$); values.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
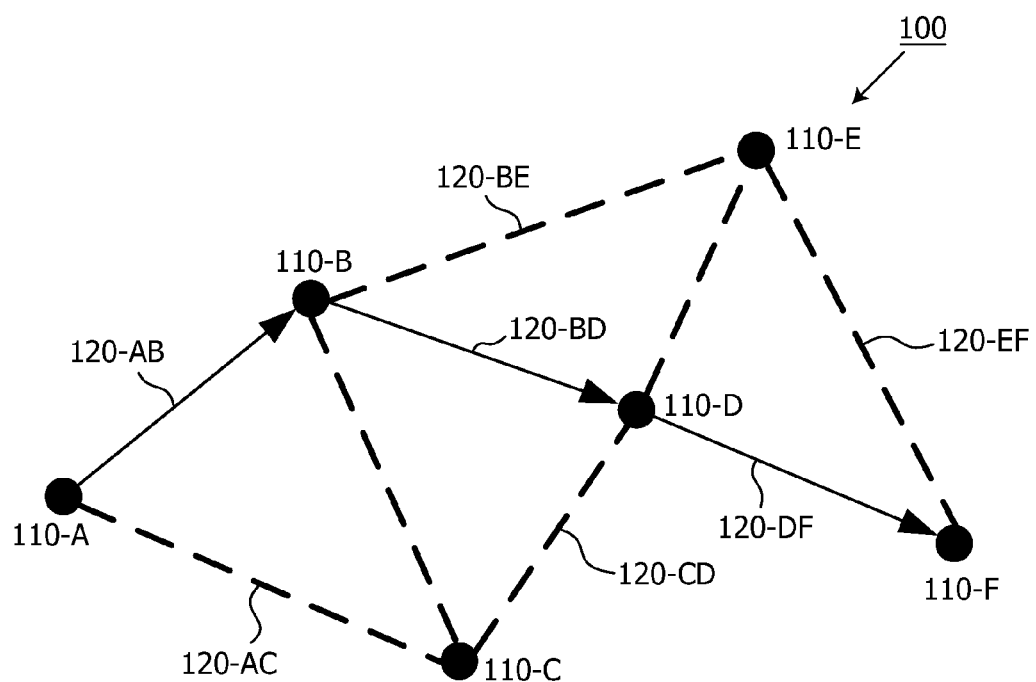
FIG. 1 is a schematic diagram of a mesh WiMedia WPAN.

It is important to note that the embodiments disclosed by the invention are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In order to fulfill the bandwidth and delay requirements of at least multimedia applications in WiMedia based WPANs, sufficient medium time (i.e., media allocation slots) should be reserved to links and nodes in paths. In WiMedia based networks, nodes reserve MAS through a distributed reservation protocol. The number of MAS reserved to a node does not reflect the medium time available for links starting or ending with the node. For examples, the path from a source node 110-A to a destination node 110-F includes the nodes 110-A, 110-B, 110-D, and 110-F and links 120-AB, 120-BD, and 120-DF (see FIG. 1). The node 110-B can access the medium during MAS-1 and MAS-2, while the node 110-D during MAS-3 and MAS-4. Thus the link 120-BD has no available MAS for transmission. Therefore, using only the available MAS of a node to decide whether a path traveling through the node has sufficient medium time to support the application is an error-prone approach. In addition, some MAS may be allocated to upstream transmissions and the other to downstream. Therefore, this should also be considered when determining if a path has sufficient medium time to support the application.

Figure 2:
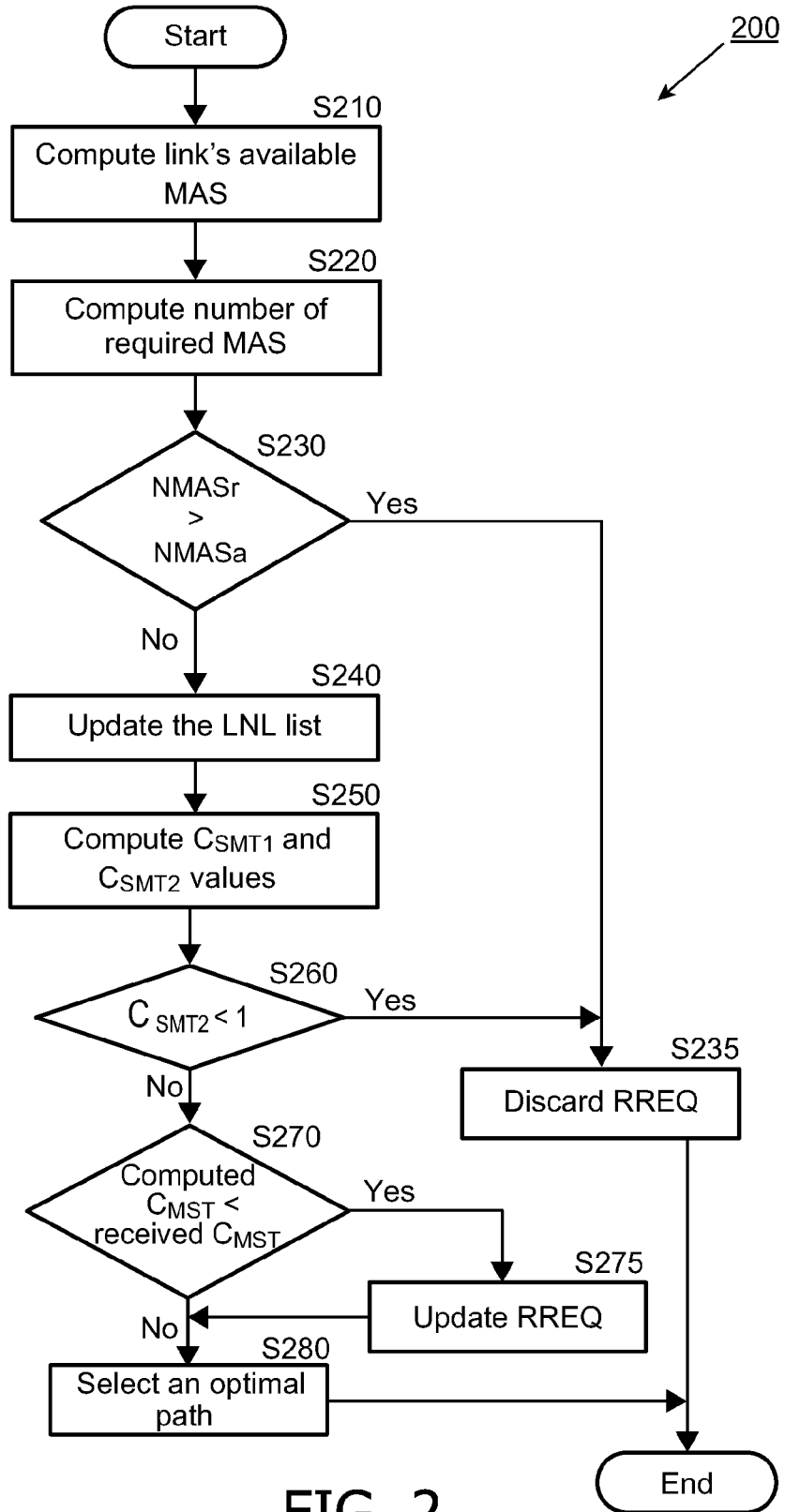
FIG. 2 is a flowchart describing the path discovery method implemented in accordance with an embodiment of the invention.

FIG. 2 shows an exemplary and non-limiting flowchart 200 describing the method for discovering paths in wireless networks implemented in accordance with an embodiment of the invention. The discovery process selects paths with sufficient medium time to support the strict bandwidth and delay requirements of advanced applications, such as multimedia applications. To this end, an optimal path is selected based on nodes and links available MAS, link rates, and relationships between neighbor nodes.

In order to discover the optimal path a source node broadcasts a route request (RREQ) which indicates at least the source-destination pair of nodes of a path that should be established. All other nodes in the network receiving the RREQ broadcast the request to their neighbor nodes. For example, referring to the network shown in FIG. 1, the node 110-A is a source node that broadcasts a RREQ to nodes 110-B and 110-C, which in turn, transmit the RREQ to nodes 110-D and 110-E. The nodes 110-D, 110-E, and 110-F perform the same. A RREQ also includes a distributed reservation protocol (DRP) availability information element (IE), a local neighbor link list (hereinafter, the "LNL list") and other values used for the path selection. In some embodiments, the RREQ and DRP availability IE are transmitted during the same superframe. The DRP availability IE designates what MAS are reserved for the node.

The LNL list includes a set of neighboring links. A first link is a neighboring link of a second link, if a first end node of the first link is a neighbor of a second end node of the second link. For example, a link 120-AB is a neighboring link of a 120-CD, as nodes 110-B and 110-C are neighbors.

Referring to FIG. 2, at S210, a node receiving the RREQ computes the available MAS of the link, i.e., MAS available at both ending nodes of a link. An available MAS is a time slot when a DRP reservation can be established. In order to compute the link's available MAS, a node receiving a RREQ checks the DRP availability IE of the upstream node, i.e., the node that sends the RREQ. The receiving node further compares its DRP availability IE to that of the upstream node, and obtains the MAS available for both nodes. The obtained MAS are the link's available MAS. To the receiving node, the link's available MAS value is referred to as the upstream link's available MAS. To the upstream node, the link's available MAS value is also referred to as the downstream link's available MAS.

As an example, the node 110-D receives a RREQ from the node 110-C (which is the upstream node) indicating that the MAS-1 and MAS-2 are available. The availability of the node 110-D is MAS-1, MAS-2 and MAS-3, therefore the available MAS of the link 120-CD are MAS-1 and MAS-2.

At S220, the receiving node (i.e., a node that receives a RREQ) computes the number of MAS required to deliver an application's traffic over an upstream link with the node that transmitted the RREQ. The required MAS are determined based on a bandwidth requirement and the effective channel rates. The effective channel rates may be determined by the rate/link adaptation algorithm or may be fixed where no rate/link adaptation algorithm can be utilized. The receiving node also considers the PHY/MAC overhead and the average packet length used by the application when computing the required number of MASs.

At S230 a check is made to determine if the number of required MAS ("NMASr") for the upstream link of the node is larger than the number of the link's available MAS (NMASa) as computed at S210. If so, at S235 the node discards the received RREQ; otherwise, execution continues with S240.

At S240 the LNL list is updated by each receiving node. Specifically, when a source broadcasts a RREQ, the LNL list in the RREQ is empty. Each receiving node checks if the RREQ is transmitted by the source node, and if so the receiving node inserts the link between the source node and itself in the LNL list in the RREQ. If a node receives a RREQ which was not transmitted by the source node, the receiving node removes any links in the LNL list (in the RREQ) which are not neighboring links of its upstream link, and then inserts the upstream link into the LNL list. For example, if the node 110-B receives a RREQ sent from the source node 110-A, the link 120-AB is added to the LNL list. The node 110-B sends the RREQ with the LNL list to node 110-D, the node 110-B is not a source node, thus the node 110-D only insets the upstream link 120-BD into the link. It should be noted that the LNL list of a path is a set of links on the path which are neighboring links of each other and consist of a continuous part of the path. The potential LNL lists for a path between nodes 110-A and 110-F are: <120-AB; 120-BD; and 120-DF>, <120-AC, 120-CD, 120-DF>, or <120-AB, 120-BE, and 120-EF>.

At S250 each node receiving the RREQ computes upper and lower bounds of a sufficient medium time coefficient ($C_{SMT}$). The $C_{SMT}$ is the number of times of the required bandwidth for the application's traffic that can be supported on the path. For example, if the required bandwidth is 1 Gbps and the path can support bandwidth of 5 Gbps, then the $C_{SMT}$ equals to 5. In order to compute the $C_{SMT}$ values, the number of available MAS of all links in the LNL list are arranged in an increasing order, i.e., NMASa(1)<NMASa(2) <NMASa(3)< . . . <NMASa(m), where NMASs(i) is the available MAS of a link 'i' (1≤i≤m) and m is the total number of links in the list. Then, the lower bound $C_{SMT1}$ is calculated. In accordance with an exemplary embodiment, the $C_{SMT1}$ value may be calculated using the following equation:

$$C_{SMT1} = \min_{1 \leq i \leq m} \frac{NMASa(i)}{\sum_{k=1}^{i} NMASr(k)};$$

where, NMASr(i) is the required number of MAS for a link 'i' (1≤i≤m). It should be noted that $C_{SMT1}$ is equal to $C_{SMT}$ only when available MAS at link i are completely covered by available MAS at link 'j' if NMASa(i)<NMASa(j) for all i and j (1≤i,j≤m). $C_{SMT1}$ is a conservative estimation of $C_{SMT}$ and $C_{SMT1} \leq C_{SMT}$.

Without ordering NMASa values, a more conservative estimation of the medium time, $C_{SMT0}$, can be calculated. In accordance with an exemplary embodiment, the estimation $C_{SMT0}$ may be computed as follows:

$$C_{SMT0} = \frac{NMASa(upstream)}{\sum_{i=1}^{m} NMASr(i)}; \text{ and}$$

$$C_{SMT0} \leq C_{SMT1} \leq C_{SMT}$$

where, NMASa(upstream) is the number of available MAS of an upstream link of the receiving node. The upper bound of $C_{SMT}$, denoted as $C_{SMT2}$ may be computed at a node other than the destination node, as follows:

$$C_{SMT2} = \min\left(\frac{NMASa(\text{upstream})}{NMASr(\text{upstream})}, \frac{NMASa(\text{node})}{NMASr(\text{upstream}) + X_{Mlarge}}\right);$$

and it may be computed by the destination node as follows:

$$C_{SMT2} = \frac{NMASa(\text{upstream})}{NMASr(\text{upstream})};$$

where, NMASr(upstream) is the number of required MAS of the upstream link and NMASa(node) is the number of available MAS of the node itself. The $C_{SMT2}$ value only considers the upstream link and the lowest possible requirement of the downstream link. Therefore, it is an aggressive estimation of $C_{SMT}$, namely $C_{SMT0} \leq C_{SMT1} \leq C_{SMT} \leq C_{SMT2}$.

Each RREQ carries both the values of the coefficients $C_{SMT1}$ and $C_{SMT2}$. Optionally, a RREQ may include the values of $C_{SMT0}$ and $C_{SMT1}$ in the RREQ. Initially, the source node sets the values of the coefficients $C_{SMT1}$ and $C_{SMT2}$ as follows:

$$C_{SMT1} = C_{SMT2} = \frac{NMASa(\text{node})}{X_{Mlarge}};$$

where, $X_{Mlarge}$ is the number of MAS required for a highest-data-rate (e.g., 480 Mbps in WiMedia 1.0 MAC) to deliver the traffic over the link.

It should be noted that each node may also record the updated values of $C_{SMT1}$ and $C_{SMT2}$ for the RREQ. If the node receives a RREQ belonging to the same path that the $C_{SMT}$ values have been computed to, it may only broadcast/forward the newly received RREQ when one or both of $C_{SMT1}$ and $C_{SMT2}$ is larger than the recorded value(s), and the node may also update these recorded values if that happens. In this way, the discovery method can find the path with the largest end-to-end available bandwidth.

At S260 it is checked if the computed $C_{SMT2}$ value is less than one. If so, the execution proceeds to S235 where the receiving node discards the RREQ; otherwise, execution continues with S270 where another check is made to determine if each of the computed $C_{SMT1}$ and $C_{SMT2}$ values is smaller than the respective value designated in the received RREQ. If so, at S275, the RREQ is updated to include the values computed at S250; otherwise execution continues with S280.

At S280, an optimal path between a source node and destination node is selected. The selection is made by the destination node. Specifically, if a destination node receives multiple RREQs, it assigns higher priorities to paths (i.e., a set of links that RREQs have traveled through) with higher values of the parameter $C_{SMT1}$. If two paths have the same value of $C_{SMT1}$, the destination node assigns a higher priority to the path with a higher value of $C_{SMT2}$ in selecting paths.

It should be noted that the method described herein can be utilized to estimate the available bandwidth of a path that RREQ has traveled through. The available bandwidth ($BW_a$) is a function of the required bandwidth ($BW_{req}$) and the $C_{SMT}$ values and is between the range of:

$$C_{SMT1} \times BW_{req} \leq BW_a \leq C_{SMT2} \times BW_{req}$$

It should be appreciated that the existing path discovery protocols, such as DSR and AODV can be adapted to implement the path discovery method disclosed herein. Furthermore, the disclosed method can be implemented in communication systems including, but not limited to, a UWB based WPANs, WiMedia based wireless networks and WPANs, or any time division multiple access (TDMA) or super-frame based wireless networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What I claim is:

1. A method for discovering a path between a source node and a destination node in mesh wireless media (WiMedia) based networks, wherein the path has sufficient medium time to enable efficient data transfers over the path, the method comprising:
    upon receiving a route request (RREQ), computing a number of available medium access slots (MAS) of a wireless link between a node receiving the RREQ and a node transmitting the RREQ;
    computing a number of required MAS to deliver data over the wireless link in an upstream direction, wherein the computation of the number of required MAS is based on a bandwidth requirement and effective channel rates of the path;
    updating a local neighbor link (LNL) list when the number of required MAS is not above the number of available MAS;
    computing an upper bound value and a lower bound value of a sufficient medium time coefficient ($C_{SMT}$), wherein the lower bound value $C_{SMT1}$ is computed by $$C_{SMT1} = \min_{1 \leq i \leq m} \frac{NMASa(i)}{\sum_{k=1}^{i} NMASr(k)},$$

NMASr(i) is the number of required MAS for a wireless link (i) and NMASa(i) is the number of available MAS for a wireless link (i) out of 'm' links; and
    selecting the path based on at least the upper and lower bound $C_{SMT}$ values.

2. The method of claim 1, further comprising discarding the received RREQ when the number of required MAS is above the number of available MAS.

3. The method of claim 1, wherein the LNL list is a data structure of the RREQ and is empty when the RREQ is first transmitted by the source node.

4. The method of claim 3, wherein updating the LNL list further comprises:
inserting a wireless link between the source node and the receiving node into the LNL list, when the received RREQ was transmitted by the source node;
removing wireless links in the LNL list which are not neighboring wireless links of a receiving node's wireless link in an upstream direction, when the received RREQ was not transmitted by the source node; and
inserting the wireless link in the upstream direction into the LNL list, when the received RREQ was not transmitted by the source node.

5. The method of claim 1, wherein the upper bound value $C_{SMT2}$ is computed by a forwarding node using:

$$C_{SMT2} = \min\left(\frac{NMASa(\text{upstream})}{NMASr(\text{upstream})}, \frac{NMASa(\text{node})}{NMASr(\text{upstream}) + X_{Mlarge}}\right);$$

or
by the destination node using:

$$C_{SMT2} = \frac{NMASa(\text{upstream})}{NMASr(\text{upstream})}$$

wherein, NMASr(upstream) is the number of required MAS of a wireless link in the upstream direction, NMASa(node) is the number of available MAS of the receiving node, and $X_{Mlarge}$ is a number of MAS required to support high data rates.

6. The method of claim 5, further comprising discarding the received RREQ if the upper bound value $C_{SMT2}$ is less than one.

7. The method of claim 5, further comprising updating the received RREQ to include the computed lower bound value $C_{SMT1}$ when the computed lower bound value $C_{SMT1}$ is smaller than the respective value designated in the received RREQ; and updating the received RREQ to include the computed upper bound value $C_{SMT2}$ when the computed upper bound value $C_{SMT2}$ is smaller than the respective value designated in the received RREQ.

8. The method of claim 1, wherein the selection of the path is performed by the destination node.

9. The method of claim 8, wherein the path with a highest value of the lower bound value $C_{SMT1}$ is selected.

10. The method of claim 1, wherein computing the number of available MAS of the wireless link comprises determining MAS available to the receiving node and MAS available to the transmitting node as the number of available MAS of the wireless link.

11. The method of claim 1, wherein the selected path has a largest end-to-end available bandwidth from all possible paths between the source node and the destination node.

12. A non-transitory computer readable medium having stored thereon computer executable code when executed causing a processor to perform the process of discovering a path between a source node and a destination node in mesh wireless media (WiMedia) based networks, wherein the path has sufficient medium time to enable efficient data transfers over the path, comprising:
upon receiving a route request (RREQ), computing a number of available medium access slots (MAS) of a wireless link between a node receiving the RREQ and a node transmitting the RREQ;
computing a number of required MAS to deliver data over the wireless link in an upstream direction, wherein the computation of the number of required MAS is based on a bandwidth requirement and effective channel rates of the path;
updating a local neighbor link (LNL) list when the number of required MAS is not above the number of available MASs;
computing an upper bound value and a lower bound value of sufficient medium time coefficient ($C_{SMT}$), wherein the lower bound value $C_{SMT1}$ is computed by $$C_{SMT1} = \min_{1 \leq i \leq m} \frac{NMASa(i)}{\sum_{k=1}^{i} NMASr(k)},$$

NMASr(i) is the number of required MAS for a wireless link (i) and NMASa(i) is the number of available MAS for a wireless link (i) out of 'm' links; and
selecting the path based on at least the upper and lower bound $C_{SMT}$ values.

13. A wireless node apparatus operable in a distributed wireless network, comprising:
a radio transceiver configured to receive and transmit radio signals over a wireless medium;
a processor;
a memory for storing instructions that, when executed, configure the processor to:
compute a number of available medium access slots (MAS) of a wireless link between a node receiving the RREQ and a node transmitting the RREQ, upon reception of a route request (RREQ);
compute a number of required MAS to deliver data over the wireless link in an upstream direction, wherein the computation of the number of required MAS is based on a bandwidth requirement and effective channel rates of the path;
update a local neighbor link (LNL) list when the number of required MAS is not above the number of available MAS;
compute an upper bound value and a lower bound value of a sufficient medium time coefficient ($C_{SMT}$), wherein the lower bound value $C_{SMT1}$ is computed by $$C_{SMT1} = \min_{1 \leq i \leq m} \frac{NMASa(i)}{\sum_{k=1}^{i} NMASr(k)},$$

NMASr(i) is the number of required MAS for a wireless link (i) and NMASa(i) is the number of available MAS for a wireless link (i) out of 'm' links; and
select the path based on at least the upper and lower bound $C_{SMT}$ values.

* * * * *